United States Patent
Boe et al.

(10) Patent No.: US 7,264,201 B2
(45) Date of Patent: *Sep. 4, 2007

(54) PROCESS FOR REDUCING THE AERODYNAMIC LOADS APPLIED TO THE ELEVATORS OF AN AIRCRAFT DURING TAKEOFF

(75) Inventors: Régis Boe, Leguevin (FR); Frédéric Sauvinet, Tournefeuille (FR)

(73) Assignee: Airbus France, Toulouse (FR)

( * ) Notice: Subject to any disclaimer, the term of this patent is extended or adjusted under 35 U.S.C. 154(b) by 412 days.

This patent is subject to a terminal disclaimer.

(21) Appl. No.: 11/002,067

(22) Filed: Dec. 3, 2004

(65) Prior Publication Data

US 2005/0178899 A1   Aug. 18, 2005

(30) Foreign Application Priority Data

Dec. 19, 2003   (FR)   ................................. 03 14951

(51) Int. Cl.
*B64C 5/02*   (2006.01)
*B64C 9/00*   (2006.01)

(52) U.S. Cl. ..................................... 244/75.1
(58) Field of Classification Search .............. 244/75.1, 244/82, 87, 99.14, 99.3, 215
See application file for complete search history.

(56) References Cited

U.S. PATENT DOCUMENTS

| | | | | |
|---|---|---|---|---|
| 1,827,304 | A * | 10/1931 | Thurston | 244/82 |
| 3,000,595 | A * | 9/1961 | Dorn | 244/82 |
| 3,363,862 | A * | 1/1968 | Walter et al. | 244/82 |
| 4,034,334 | A | 7/1977 | Allyn | |
| 4,043,523 | A * | 8/1977 | Bartoe, Jr. | 244/87 |
| 4,825,375 | A | 4/1989 | Nadkarni et al. | |
| 5,002,240 | A * | 3/1991 | du Pont | 244/87 |
| 7,051,976 | B2 * | 5/2006 | Boe et al. | 244/75.1 |

* cited by examiner

*Primary Examiner*—Rob Swiatek
(74) *Attorney, Agent, or Firm*—Stevens, Davis, Miller & Mosher, LLP

(57) ABSTRACT

Process for reducing the aerodynamic loads applied to the elevators of an aircraft during takeoff wherein, prior to the rotation, the adjustable horizontal tailplane (2) is nose-up overdeflected and the elevators (4) are nose-down deflected.

3 Claims, 3 Drawing Sheets

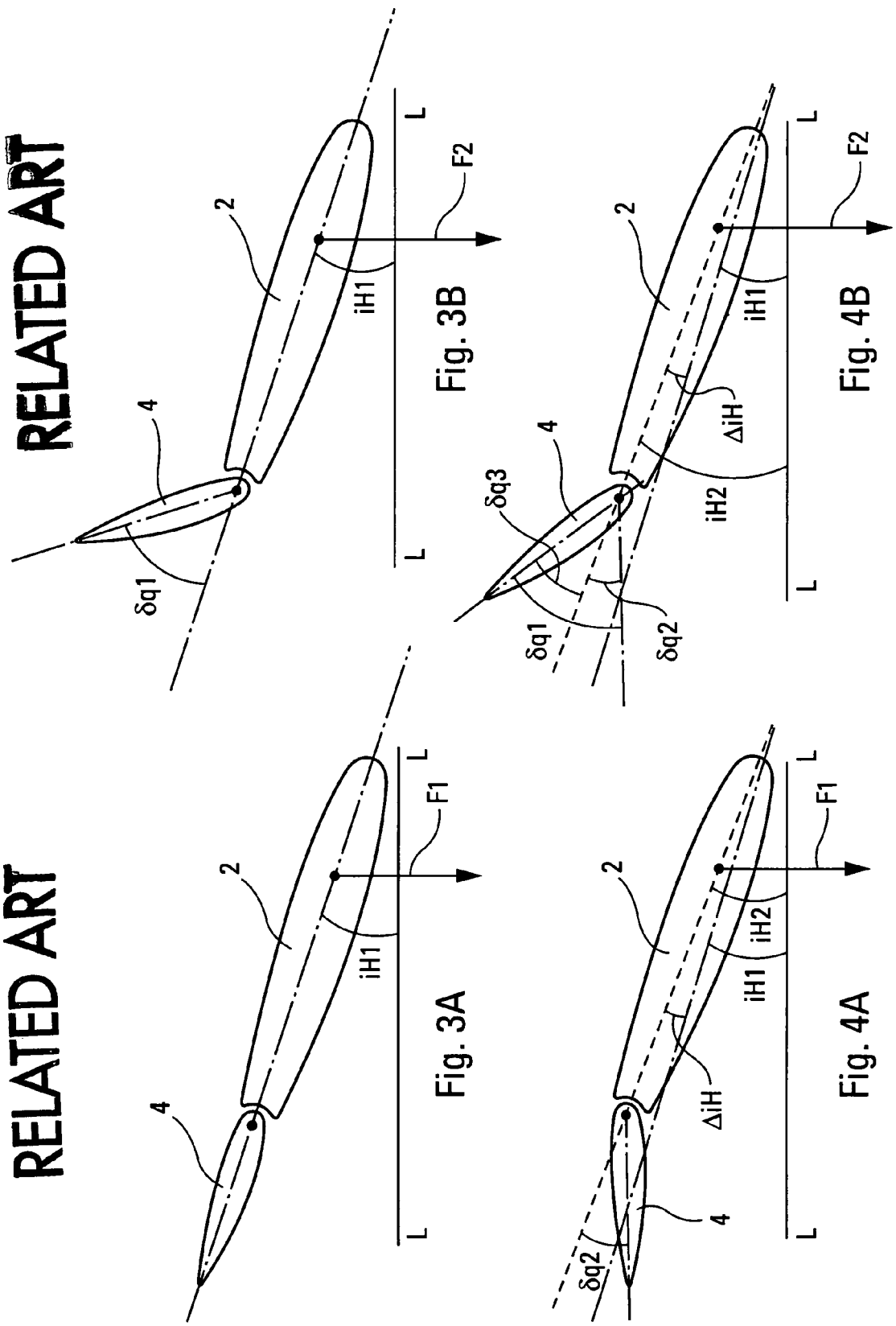

Figure 1:
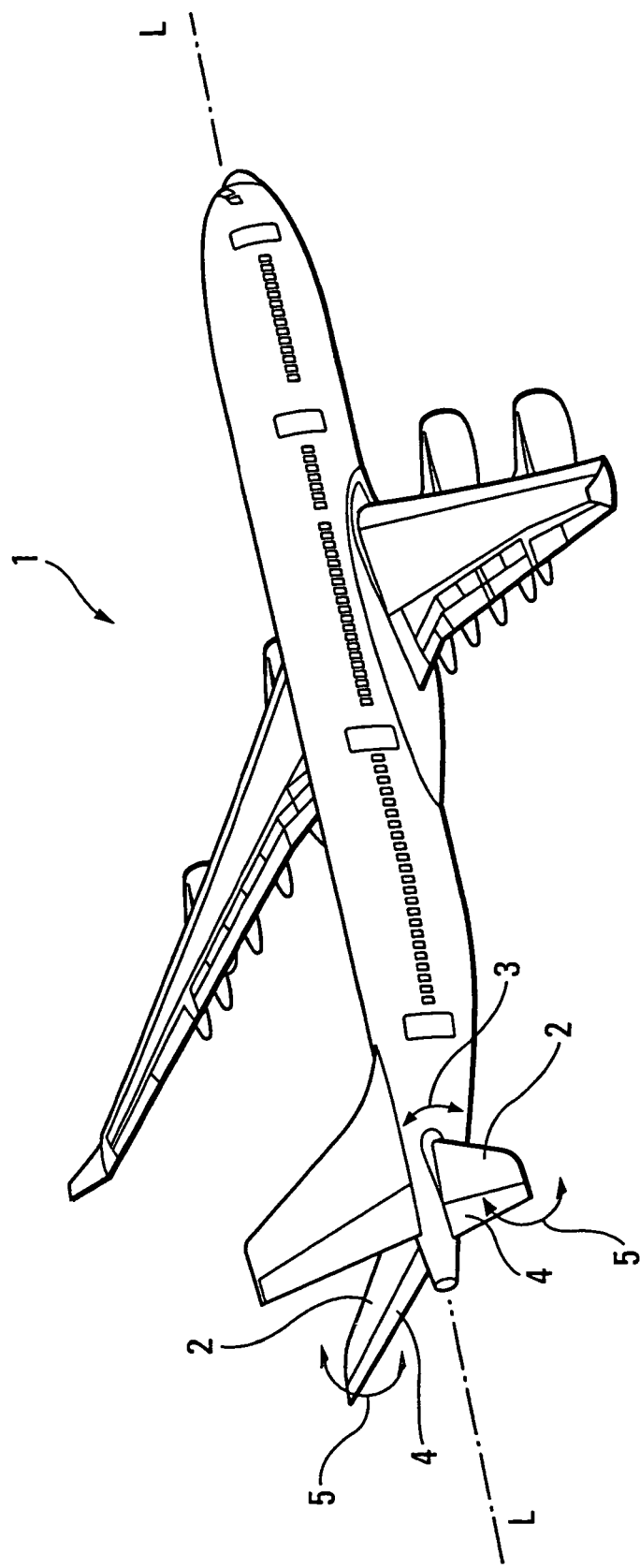

PROCESS FOR REDUCING THE AERODYNAMIC LOADS APPLIED TO THE ELEVATORS OF AN AIRCRAFT DURING TAKEOFF

The present invention relates to a process for reducing the aerodynamic loads undergone by the elevators of an aircraft during takeoff.

It is known that certain aircraft comprise a stabilizing horizontal tailplane that can be adjusted in inclination. An adjustable horizontal tailplane such as this is, in the art, designated by one or other of the abbreviations PHR (standing for Plan Horizontal Réglable) or THS (standing for Trimmable Horizontal Stabilizer). Just like a fixed horizontal tailplane, an adjustable horizontal tailplane is provided with elevators forming the trailing edge of said adjustable horizontal tailplane.

An adjustable horizontal tailplane can be deflected in the nose-up or nose-down direction and it is used in certain flight phases. For example, during the takeoff of the aircraft, it is customary to deflect said adjustable horizontal tailplane through action of the pilot or of an automatic system, said elevators being in direct aerodynamic alignment with said tailplane and the value of the angle of deflection of the adjustable horizontal tailplane depending on several parameters of the aircraft, such as the longitudinal position of the center of gravity, the total weight on takeoff, the configuration of the leading edge slats and of the trailing edge flaps, the thrust, the speed at the moment of the lifting rotation at the end of the ground run, etc.

This value of the angle of deflection is significant since it conditions the behavior of the airplane during the rotation phase, which begins when the pilot pulls on the stick so as to actuate said elevators in the nose-up direction and which finishes when the attitude of the aircraft is stabilized around a predetermined value, for example equal to 15°. If the value of this angle of deflection is too large, it may lead to spontaneous takeoff without intervention from the pilot or a tail touch or else, on the contrary, if it is too small, an arduous takeoff penalizing the performance of the aircraft.

As a general rule, on takeoff, the value of the angle of deflection of the adjustable horizontal tailplane corresponds to nose-up, this being the case in particular when the center of gravity of the aircraft occupies a forward longitudinal position: specifically, in this case, the aircraft is difficult to turn at the moment of rotation and the adjustable horizontal tailplane must create a high nose-up moment. However, when the center of gravity of the aircraft is in a rear longitudinal position, the aircraft tends to turn very easily and the adjustable horizontal tailplane must create only a small pitching moment, which may be nose-up, but exceptionally nose-down.

At the moment of rotation, the elevators attached to the adjustable horizontal tailplane are controlled by the pilot of the aircraft so as to take, from their position in direct aerodynamic alignment with said tailplane, a position such as to make said aircraft nose-up which corresponds to a considerable fraction (for example ⅔) of the total nose-up swing of said elevators.

It will be noted that, in particular in the case where the weight, and hence the speed of rotation, of the aircraft are high, the aerodynamic loads applied to the elevators are high. As a result, these elevators may be saturated, so that takeoff is slower and the aircraft does not react to an additional pull by the pilot on the stick in order to accelerate the takeoff with a view, for example, to avoiding an obstacle on the runway.

Of course, to solve such a problem, it would be conceivable to increase the power of the system for actuating said elevators and/or their area. However, this would then result in an increase in the weights and costs in respect of the aircraft.

An object of the present invention is to remedy these drawbacks.

To this end, according to the invention, the process for reducing the aerodynamic loads undergone by the elevators of an aircraft during takeoff rotation, said aircraft comprising an adjustable horizontal tailplane to which said elevators are hinged and which is deflected by an angle of inclination of predetermined value with a view to the rotation, is noteworthy in that, prior to the deployment of said elevators for the rotation:

said adjustable horizontal tailplane is deflected, in the nose-up direction, with a greater actual value of angle of inclination than a value corresponding to a customary configuration in which said elevators are in direct aerodynamic alignment with said adjustable horizontal tailplane; and said elevators are deflected in the nose-down direction, in such a way that the combination of the nose-up action of said adjustable horizontal tailplane and of the nose-down action of said elevators engenders a nose-up resultant aerodynamic force which is at least approximately equal to that engendered by the assembly of said adjustable horizontal tailplane and of said elevators in said customary configuration.

Thus, by virtue of the present invention, for an aerodynamic action preceding the rotation equivalent to that customarily obtained, the position of the elevators, from which their deflection will be performed at the moment of rotation, is shifted toward the nose-down values. Consequently, the nose-up deflection travel of said elevators with respect to said adjustable horizontal tailplane is reduced, thereby, of course, bringing about a decrease in the loads applied to said elevators at the moment of rotation.

Preferably, the difference in angle of inclination of said adjustable horizontal tailplane between said actual value and said value corresponding to the customary configuration is chosen so as to bring about an amplitude of the nose-down deflection of said elevators at most equal to half, and preferably at most a quarter, of the total angular swing of said elevators for the obtaining of the rotation.

Experiments and calculations have shown that, for the AIRBUS A380 wide-bodied airplane, for which the total nose-up swing of the elevators that is used for rotation is of the order of 20°, an increase of 2.5° in the angle of inclination of the adjustable horizontal tailplane, with respect to said customary configuration, brings about a shift of 5° in the nose-down direction of the elevators and a reduction of 20% in the aerodynamic loads applied to them during rotation.

The figures of the appended drawing will elucidate the manner in which the invention may be embodied. In these figures, identical references denote similar elements.

FIG. 1 shows, in diagrammatic perspective, a wide-bodied civil aircraft provided with an adjustable horizontal tailplane.

Figure 2:
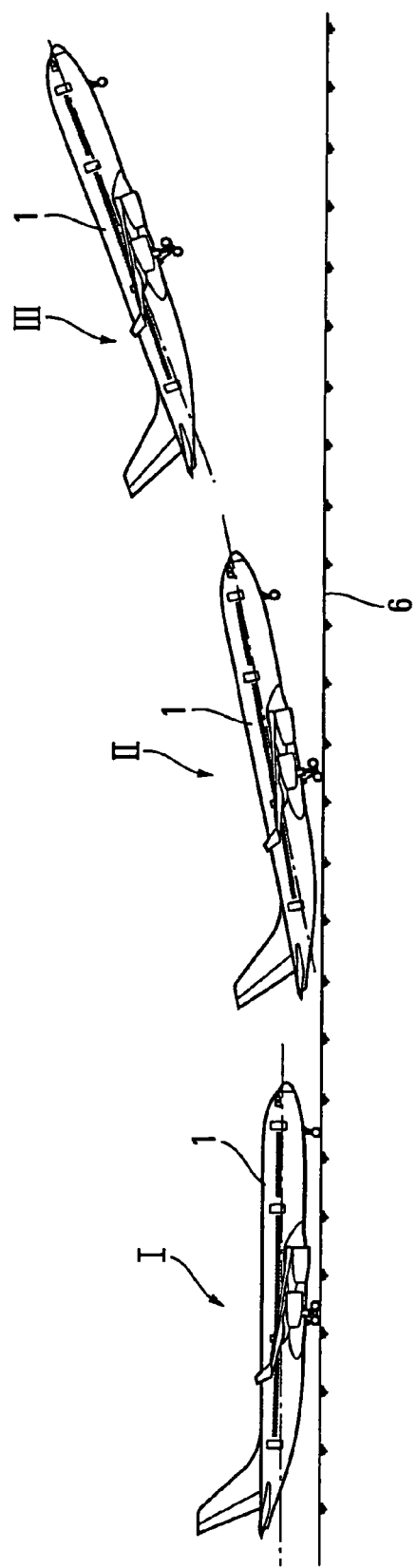

FIG. 2 diagrammatically illustrates, in three successive positions, the takeoff phase of said aircraft including the rotation.

FIGS. 3A and 3B diagrammatically show the customary positioning of the adjustable horizontal tailplane and of the elevators attached thereto, respectively before and starting from the takeoff rotation.

FIGS. 4A and 4B diagrammatically show an exemplary positioning, in accordance with the invention, of the adjustable horizontal tailplane and of the elevators, respectively before and starting from the takeoff rotation.

The wide-bodied airplane 1, shown diagrammatically by FIG. 1, exhibits a longitudinal axis L-L and comprises a horizontal tailplane 2 that can be adjusted in inclination, as is illustrated by the double arrow 3. To the rear edge of said adjustable horizontal tailplane 2 are hinged elevators 4 that can turn with respect to said tailplane 2, as is illustrated by the double arrows 5.

Illustrated in FIG. 2 are three situations I, II and III experienced by said airplane 1 during its liftoff.

In situation I, the aircraft is rolling over the ground 6, accelerating so as to reach its rotation speed VR. During this rolling phase, in the customary technique (see FIG. 3A), the adjustable horizontal tailplane 2 is inclined, for example nose-up, by an angle iH1 with respect to said longitudinal axis L-L and the elevators 4 are in a position that is in direct aerodynamic alignment with said adjustable horizontal tailplane 2. In this customary configuration, the assembly of said adjustable horizontal tailplane 2 and of the elevators 4 engenders a nose-up aerodynamic force F1 producing a nose-up pitching moment M1 for the aircraft 1.

Still in a customary manner, when the aircraft 1 by rolling over the ground reaches the rotation speed VR (situation II in FIG. 2), the pilot actuates the elevators 4 so as to make them take a nose-up position, defined by an angle of swing $\delta q1$ with respect to the adjustable horizontal tailplane 2 (see FIG. 3B). The assembly of said adjustable horizontal tailplane 2 and of the elevators 4 then engenders a nose-up aerodynamic force F2, greater than F1, producing a nose-up pitching moment M2, greater than M1.

After liftoff of the aircraft 1 and its stabilization on an inclined trajectory (situation III in FIG. 2), the adjustable horizontal tailplane 2 is brought parallel to the axis L-L, with the elevators 4 in direct aerodynamic alignment with said tailplane 2.

As mentioned hereinabove, especially if the weight of the aircraft 1 and its rotation speed VR are high, considerable aerodynamic loads are applied to the elevators 4 when they pass from their position of FIG. 3A to their position of deployment of FIG. 3B, this possibly leading to the saturation of said elevators.

To remedy this drawback, the present invention operates in the manner illustrated in FIGS. 4A and 4B, namely:

during the rolling illustrated by situation I of FIG. 2, the adjustable horizontal tailplane 2 is inclined by a nose-up angle iH2, greater than the angle iH1 by a quantity $\Delta iH$, and simultaneously, the elevators 4 are deflected in the inverse direction to the adjustable horizontal tailplane 2, that is to say in the nose-down direction, so as to take a nose-down angle $\delta q2$ with respect to said tailplane 2.

In this procedure, illustrated by FIG. 4A, the angles iH1 and $\delta q2$ are chosen such that the nose-up aerodynamic force engendered by the combination of the adjustable horizontal tailplane 2 and of the elevators 4 is equal to the aerodynamic force F1 of the customary configuration shown by FIG. 3A.

Thus, when, to obtain rotation, the elevators 4 are deflected nose-up by the angular swing $\delta q1$ so as to engender the nose-up aerodynamic force F2 (see FIG. 4B), the initial part of amplitude $\delta q2$ of this deflection is effected without stress for said elevators 4. Moreover, with respect to the adjustable horizontal tailplane, said elevators 4 undergo a maximum deflection $\delta q3$ that is only equal to the difference $\delta q1-\delta q2$.

As a result, in the configuration in accordance with the present invention illustrated by FIGS. 4A and 4B, the elevators 4 undergo, during rotation, lower aerodynamic loads than those to which they are subject in the customary configuration of FIGS. 3A and 3B.

By way of nonlimiting example, given hereinbelow are a few exemplary values, appropriate to the AIRBUS A380 airplane, for certain of the angles mentioned above:

| | | | |
|---|---|---|---|
| $\Delta ih = 2.5°$ | $\delta q1 = 20°$ | $\delta q2 = 5°$ | $\delta q3 = 15°$. |

The invention claimed is:

1. A process for reducing the aerodynamic loads undergone by elevators of an aircraft during takeoff rotation, said aircraft comprising an adjustable horizontal tailplane to which said elevators are hinged and which is deflected by an angle of inclination of predetermined value with a view to the rotation, said process comprising:

prior to deployment of said elevators for the rotation, deflecting said adjustable horizontal tailplane, in the nose-up direction, with a greater actual value (iH2) of angle of inclination than a value (iH1) corresponding to a customary configuration in which said elevators are in direct aerodynamic alignment with said adjustable horizontal tailplane; and deflecting said elevators in the nose-down direction, in such a way that the combination of the nose-up action of said adjustable horizontal tailplane and of the nose-down action of said elevators engenders a nose-up resultant aerodynamic force which is at least approximately equal to that (F1) engendered by the assembly of said adjustable horizontal tailplane and of said elevators in said customary configuration.

2. The process as claimed in claim 1, wherein the angular difference ($\Delta iH$) between said actual value (iH2) and said value (iH1) corresponding to said customary configuration is chosen so as to bring about an amplitude ($\delta q2$) of the nose-down deflection of said elevators at most equal to half the total angular swing ($\delta q1$) of said elevators with respect to said adjustable horizontal tailplane for the obtaining of the rotation.

3. The process as claimed in claim 2, wherein said amplitude of the nose-down deflection ($\delta q2$) of said elevators is at most equal to a quarter of said total angular swing ($\delta q1$).

* * * * *